(12) United States Patent
Walker

(10) Patent No.: US 9,215,950 B2
(45) Date of Patent: Dec. 22, 2015

(54) PORTABLE GRILL ASSEMBLY

(76) Inventor: Jeffrey D. Walker, Ortonville, MI (US)

( * ) Notice: Subject to any disclaimer, the term of this patent is extended or adjusted under 35 U.S.C. 154(b) by 541 days.

(21) Appl. No.: 13/495,227

(22) Filed: Jun. 13, 2012

(65) Prior Publication Data

US 2012/0312297 A1   Dec. 13, 2012

Related U.S. Application Data

(60) Provisional application No. 61/496,529, filed on Jun. 13, 2011.

(51) Int. Cl.
| | | |
|---|---|---|
| *F24C 1/16* | (2006.01) | |
| *F24B 3/00* | (2006.01) | |
| *A47J 37/07* | (2006.01) | |
| *F24B 1/20* | (2006.01) | |

(52) U.S. Cl.
CPC ............. *A47J 37/0763* (2013.01); *F24B 1/205* (2013.01); *F24B 3/00* (2013.01); *F24C 1/16* (2013.01)

(58) Field of Classification Search
CPC ........................................................ F24B 1/205
USPC ........................................................ 126/9 B
See application file for complete search history.

(56) References Cited

U.S. PATENT DOCUMENTS

| | | | | |
|---|---|---|---|---|
| 2,935,982 | A | * | 5/1960 | Otis ................................ 126/30 |
| 3,013,550 | A | * | 12/1961 | Murchie ................. 126/25 AA |
| D204,348 | S | * | 4/1966 | Shiling ......................... D7/336 |
| 3,472,151 | A | * | 10/1969 | Cox .................................. 99/340 |
| 3,794,013 | A | * | 2/1974 | Upton ............................. 126/40 |
| D327,602 | S | * | 7/1992 | Walker ......................... D7/335 |
| D369,939 | S | * | 5/1996 | Gibbs ........................... D7/335 |
| 5,535,733 | A | * | 7/1996 | Hait ................................ 126/59 |
| 5,878,739 | A | * | 3/1999 | Guidry ....................... 126/25 R |
| 5,893,357 | A | * | 4/1999 | Royer et al. .................. 126/9 R |
| 5,950,617 | A | * | 9/1999 | Lorenz .......................... 126/276 |
| D610,405 | S | | 2/2010 | McConnell |
| 2003/0001733 | A1 | * | 1/2003 | Huang .......................... 340/442 |

* cited by examiner

*Primary Examiner* — Steven B McAllister
*Assistant Examiner* — Rabeeul Zuberi
(74) *Attorney, Agent, or Firm* — Mastrogiacomo PLLC

(57) ABSTRACT

A portable grill assembly includes a grill grate, a fire tray, the fire tray including a plurality of holes, a plate configured to be secured to the fire tray, a gap created between the plate and the fire tray to enable a uniform flow of oxygen to pass through the gap on all sides of the fire tray into the holes and a grid pattern extending upward from the fire tray to elevate a fuel over the holes, and a support stake. The support stake includes at least one coupler to secure multiple sections of the support stake, the coupler includes a lip to prevent movement of sections of the support stake relative to the coupler. The support stake is configured to secure and position the fire tray a distance above the ground and to secure and position the grill grate a distance above the fire tray.

17 Claims, 13 Drawing Sheets

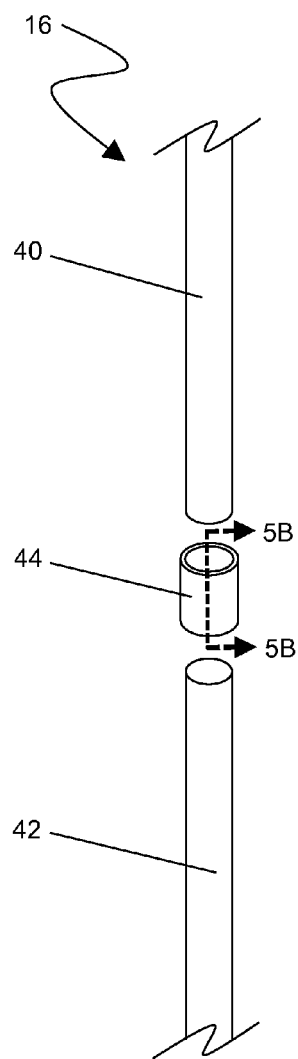
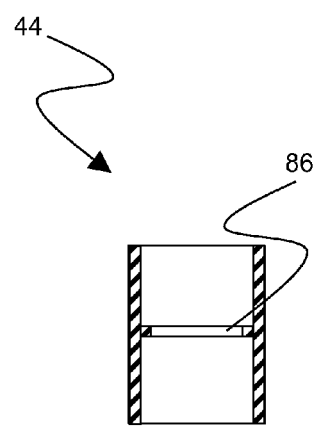
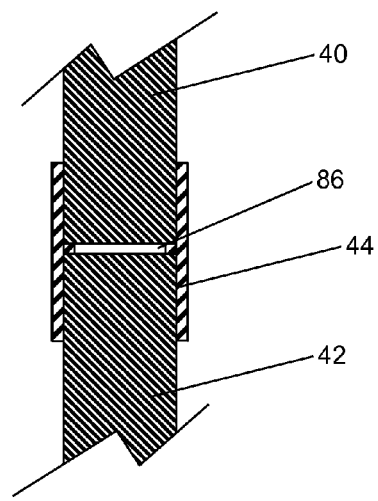
FIG. 5A
FIG. 5B
FIG. 5C

PORTABLE GRILL ASSEMBLY

CROSS REFERENCE TO RELATED APPLICATIONS

This patent application claims the benefit of priority based on U.S. Provisional Patent Application No. 61/496,529 filed on Jun. 13, 2011, which is incorporated by reference in its entirety for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON COMPACT DISC

Not Applicable

BACKGROUND OF THE INVENTION

1. Field of the Invention

The present invention relates generally to portable grills for cooking and heating food and liquid by open fire, such as a campfire, and, more particularly, to a portable grill assembly that includes a fire tray, the fire tray being used to elevate an open fire off the ground, while also being compact to facilitate ease of portability and stowage for travel.

2. Background Art

Outdoor, open fires, such as campfires, have been used to cook food for many hundreds of years. Typically, a campfire is started on the ground with fuel, such as wood, paper, leaves, and the like, oxygen and an igniter such as a match. When the fire reaches an appropriate temperature to cook food or heat liquids, a grill or grate may be placed over the fire. The grill or grate may be sized such that any type of meat, vegetable, pot, coffee maker, etc., may be placed on the grill for heating to a desired temperature for eating or drinking.

Often, a fire may burn for a period of time after the food has been cooked and consumed and many times the fire may be left unattended. An unattended open fire may contribute to the start of a larger wild fire that may grow out of control burning many acres and damaging property and endangering lives. Because of this threat, many states do not allow open ground campfires. These states may require that any fire used for cooking be contained in a unit capable of holding a fire such as a typical charcoal fire grill. While these charcoal grills work well to contain fires and cook food, they are often bulky and difficult to travel with if one is backpacking in the wilderness, traveling light such as by motorcycle, tailgating at a sporting event and the like.

Therefore, a need exists for a portable grill assembly having a fire tray that fully contains a fire for cooking and provides a means to elevate the fire off the ground, yet the grill assembly is compact enough to be easily stowed for traveling and quickly assembled.

BRIEF SUMMARY OF THE INVENTION

A portable grill assembly is provided that includes a grill grate, a fire tray, the fire tray including a plurality of holes, the holes configured to allow the flow of oxygen into the fire tray, a plate, the plate configured to be secured to a bottom surface of the fire tray by a single post, the post being positioned at the center of the plate and the bottom surface, a gap, the gap being created between the plate and the bottom surface of the fire tray by a length of the post to enable a uniform flow of oxygen to pass through the gap on all sides of the fire tray into the holes and a grid pattern, the grid pattern being integrated within the bottom surface of the fire tray and configured to extending upward from the bottom surface of the fire tray such that a fuel is elevated over the holes to enable a uniform flow of oxygen through the gap, the holes and to the fuel, and a support stake. The support stake includes at least one coupler to secure multiple sections of the support stake, the coupler including a lip, the lip configured within the inner diameter of the coupler to prevent movement of sections of the support stake relative to the coupler. The support stake is configured to secure and position the fire tray a distance above the ground and the support stake is also configured to secure and position the grill grate a distance above the fire tray.

BRIEF DESCRIPTION OF THE SEVERAL VIEWS OF THE DRAWINGS

The features and inventive aspects of the present invention will become more apparent from the following detailed description, claims, and drawings, of which the following is a brief description:

FIG. 5A is an exploded view of the mounting stake according to an embodiment of the present invention;

FIG. 5B is a cross-sectional view of the coupler of FIG. 5A according to an embodiment of the present invention;

FIG. 5C is a cross sectional view of the coupler, top segment and bottom segment according to an embodiment of the present invention;

DETAILED DESCRIPTION OF THE INVENTION

Figure 1:
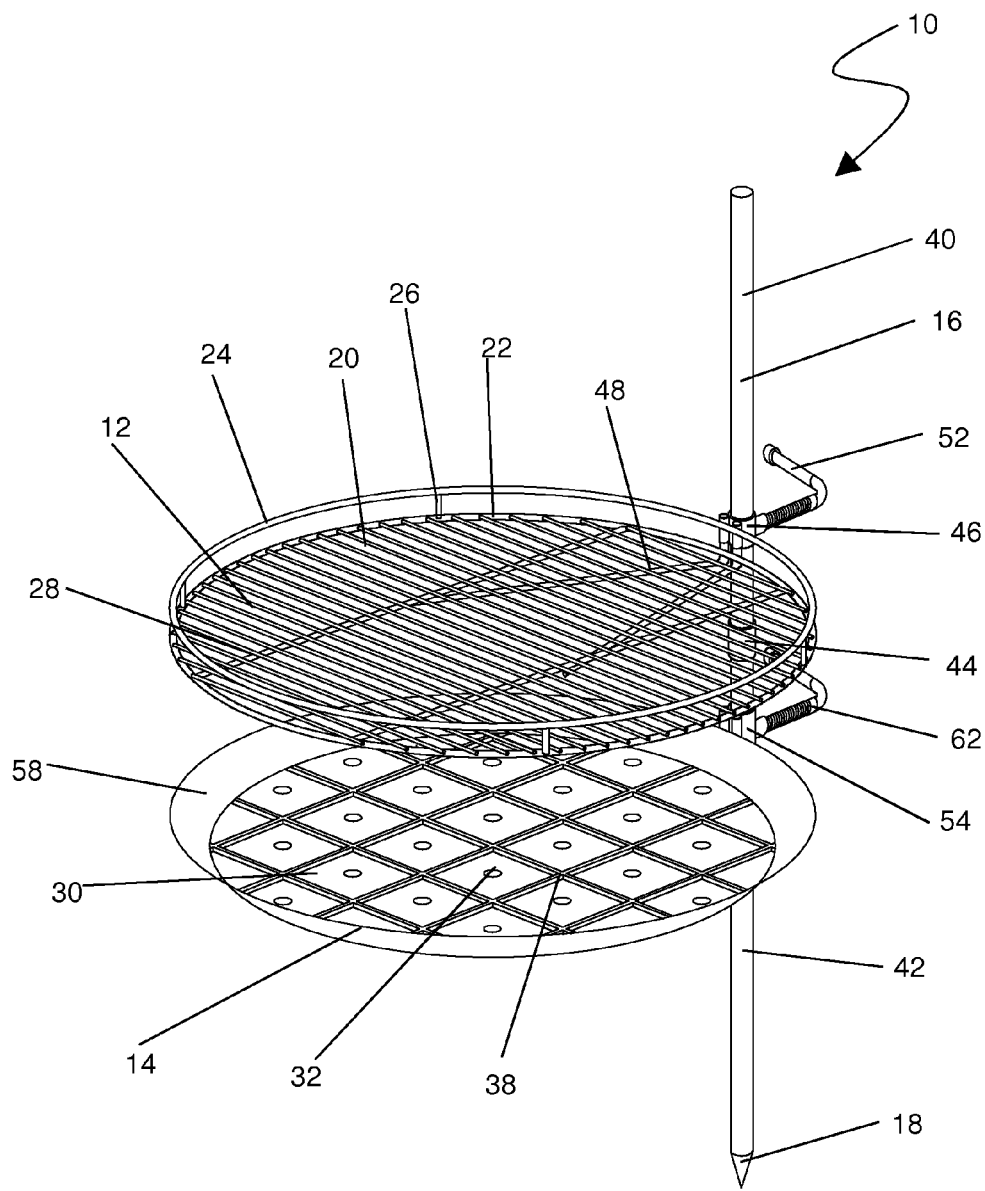
FIG. 1 is perspective view of a portable grill assembly according to an embodiment of the present invention.

Referring now to the drawings, preferred illustrative embodiments of the present invention are shown in detail. Although the drawings represent embodiments of the present invention, the drawings are not necessarily to scale and certain features may be exaggerated to better illustrate and explain the present invention. Further, the embodiments set forth herein are not intended to be exhaustive or otherwise to limit or restrict the invention to the precise forms and configurations shown in the drawings and disclosed in the following detailed description.

Now referring to the drawings, a portable grill assembly 10 is illustrated in FIGS. 1-5. Grill assembly 10 may be used to contain and elevate a fire off the ground that is to be used for cooking, heating, lighting and other uses. Because of the risk of wild fires that may be enhanced by severe droughts in many parts of the world, many government entities may require that outdoor, open fires be contained and elevated off the ground to aid in the prevention of the wild fires that may cause great damage to many thousands of acres throughout a region.

Portable grill assembly 10 includes a grill grate 12 and fire tray 14. Fire tray 14 is generally positioned under grate 12 such that any fire contained by fire tray 14 will heat and cook any liquid and food placed upon grate 12. Grill assembly 10 further includes a mounting stake 16 that may be used to secure and position grate 12 and tray 14. Furthermore, mounting stake 16 may include a pointed end 18. Generally, the pointed end of any stake is used to penetrate the ground as the stake is anchored to the ground. Pointed end 18 may aid one in driving mounting stake 16 into the ground to anchor grill assembly 10.

Grill grate 12 may be structured in a typical fashion having multiple rods 20 that are secured to an outer ring 22. Typically, rods 20 extend from one side of outer ring 22 and are generally arranged parallel to one another. Rods 20 may be evenly spaced to provide support for an item such as food so that the food does not fall through rods 20 yet they are sufficiently spaced so that the heat from the fire below may pass through to the food. It is important to note, however, that any type of grill surface may be suitable for use with grill assembly 10. These other types of grill surfaces may include solid surfaces as well as surfaces with apertures that may be shaped as diamonds, circles and triangles and the like.

Grate 12 may also include an upper ring 24 that is positioned and secured above outer ring 22 by multiple posts 26 that may extend generally upward from outer ring 22. Upper Ring 24 may be positioned and secured in this manner to help ensure that some types of food, such as hot dogs, sausage and the like (i.e. foods that are generally cylindrical in shape) that have a tendency to roll about a grill, remain on the grill while being heated.

Grate 12 may further include support dowels 28 that extend under rods 20 from one side of outer ring 22 to a second side of outer ring 22. Support dowels 28 are typically spaced apart from one another as depicted in the drawings to provide support for rods 20 and any food or cooking vessels that may be placed on grate 12. Dowels 28 are also positioned such that they perpendicularly intersect rods 20 to provide even further support for rods 20.

Grate 12 may also include a first sleeve 46 and anchor rods 48. Sleeve 46 may be assembled to grate 12 at outer ring 22 and upper ring 24. Anchor rods 48 may extend from sleeve 46 and under grate 12 and rods 20 to provide further support to grate 12 and further secure sleeve 46 to grate 12. Sleeve 46 may be designed such that the inside diameter of sleeve 46 is slightly larger than the outside diameter of stake 16. With sleeve 46 sized in this manner, sleeve 46 may be slid onto stake 16 and may slide freely about the length of stake 16.

Sleeve 46 includes a threaded hole 50 that is sized to accept a bolt 52. Hole 50 may be positioned in a side wall of sleeve 46 such that when bolt 52 is fed into hole 50, and stake 16 is positioned in sleeve 46, bolt 52 will engage a surface of stake 16. As bolt 52 continues to be fed through hole 50, the exterior surface of stake 16 will engage the interior surface of sleeve 46. When ample force is applied between bolt 52, sleeve 46 and stake 16, grate 12 will be secured to stake 16 and ready for cooking. In this particular embodiment of the present invention, bolt 52 is illustrated in the shape of an 'L' and may be designed in this manner to allow one to grasp bolt 52 with their hand and turn easily. Although bolt 52 is shown in the shape of an 'L', it is important to note, however, that bolt 52 may be any shape and still be used to secure grate 12 to stake 16.

Grate 12 may be manufactured of any materials that are capable of withstanding the temperatures generated by fires produced from wood or charcoal and used for cooking foods and heating liquids. Typically, many types of grill grates are manufactured from metals such as stainless steel. Stainless steel can be very durable against the heat that is created by fires from wood, charcoal and the like, while also withstanding the rust effects brought on by air and water. The separate pieces of grate 12 (rings 22 and 24, rods 20, posts 26, dowels 28, sleeve 46 and anchor rods 48) may all be assembled with typically welding means such that the assembly can with stand the high temperatures, multiple uses and storage for periods of time.

Fire tray 14 is round in shape and is generally positioned under grate 12 as depicted in the attached drawings. Tray 14 includes a bottom surface 30 that includes a multitude of holes 32. Tray 14 further includes a wall 58 that extends generally upward and outward from bottom surface 30 to form the upper section of tray 14. Wall 58 may be designed in this manner to capture fuel and any ash produced by the combustion process during the burning of the fuel.

Figure 2:
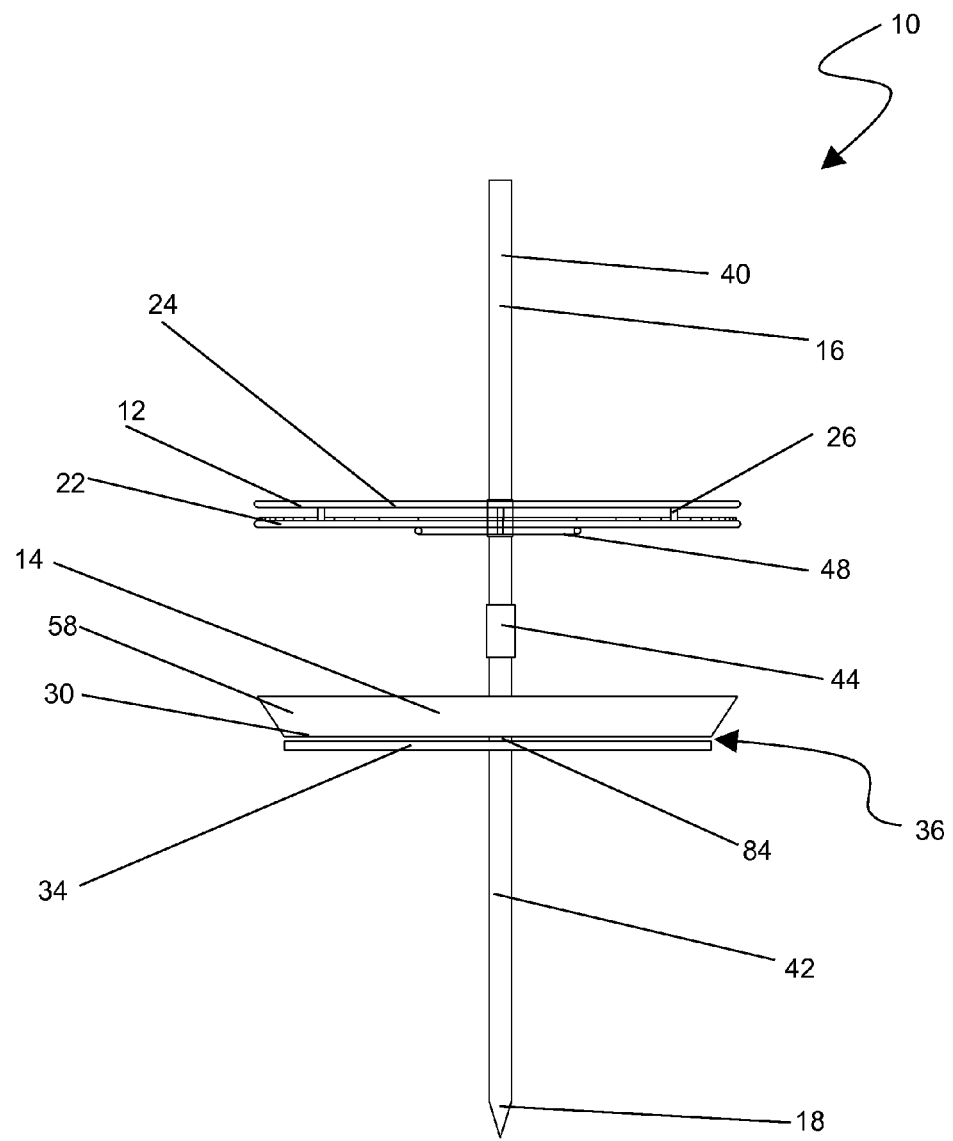
FIG. 2 is a front view of the portable grill assembly according to an embodiment of the present invention.
Figure 3:
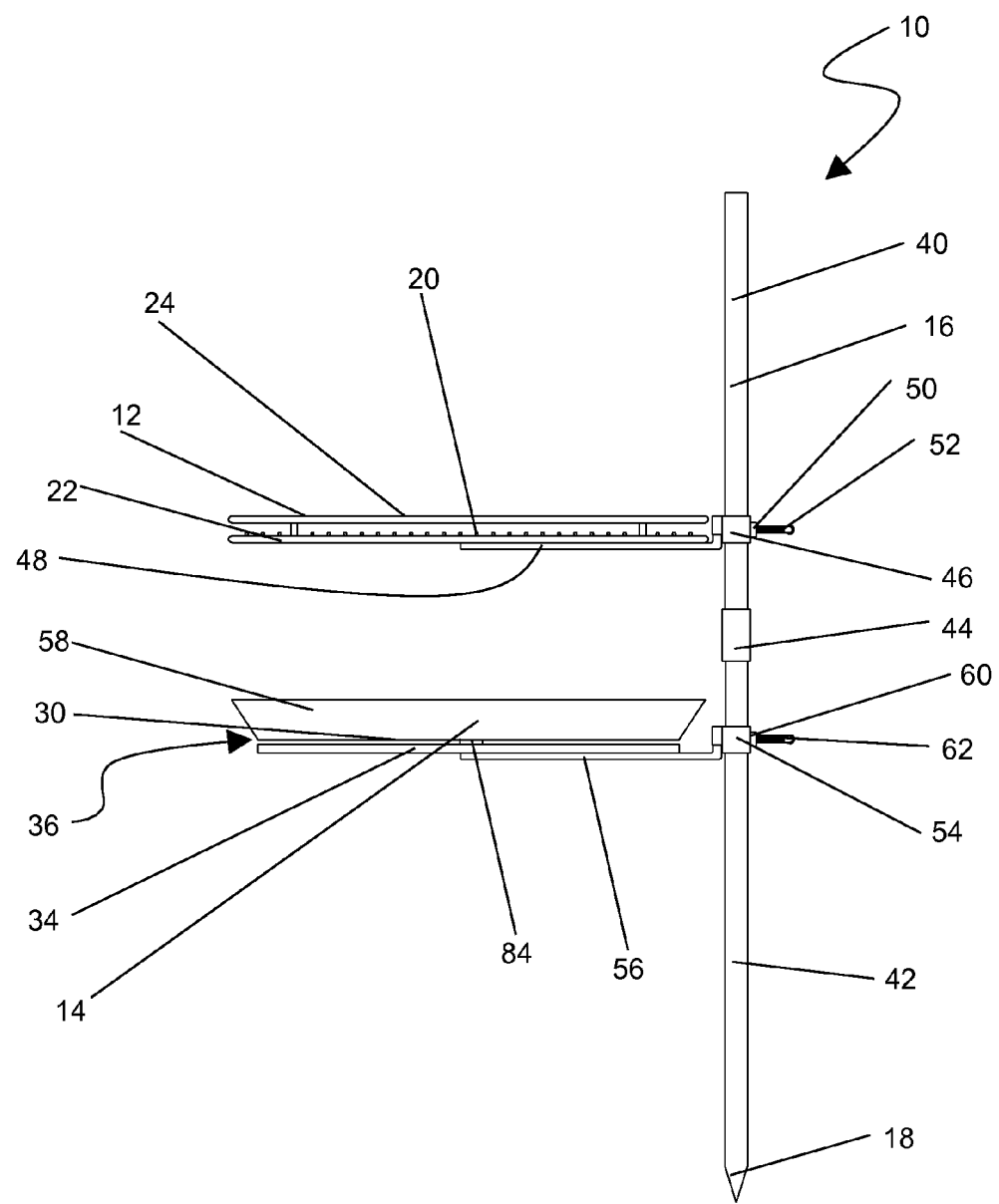
FIG. 3 is a side view of the portable grill assembly according to an embodiment of the present invention.
Figure 4:
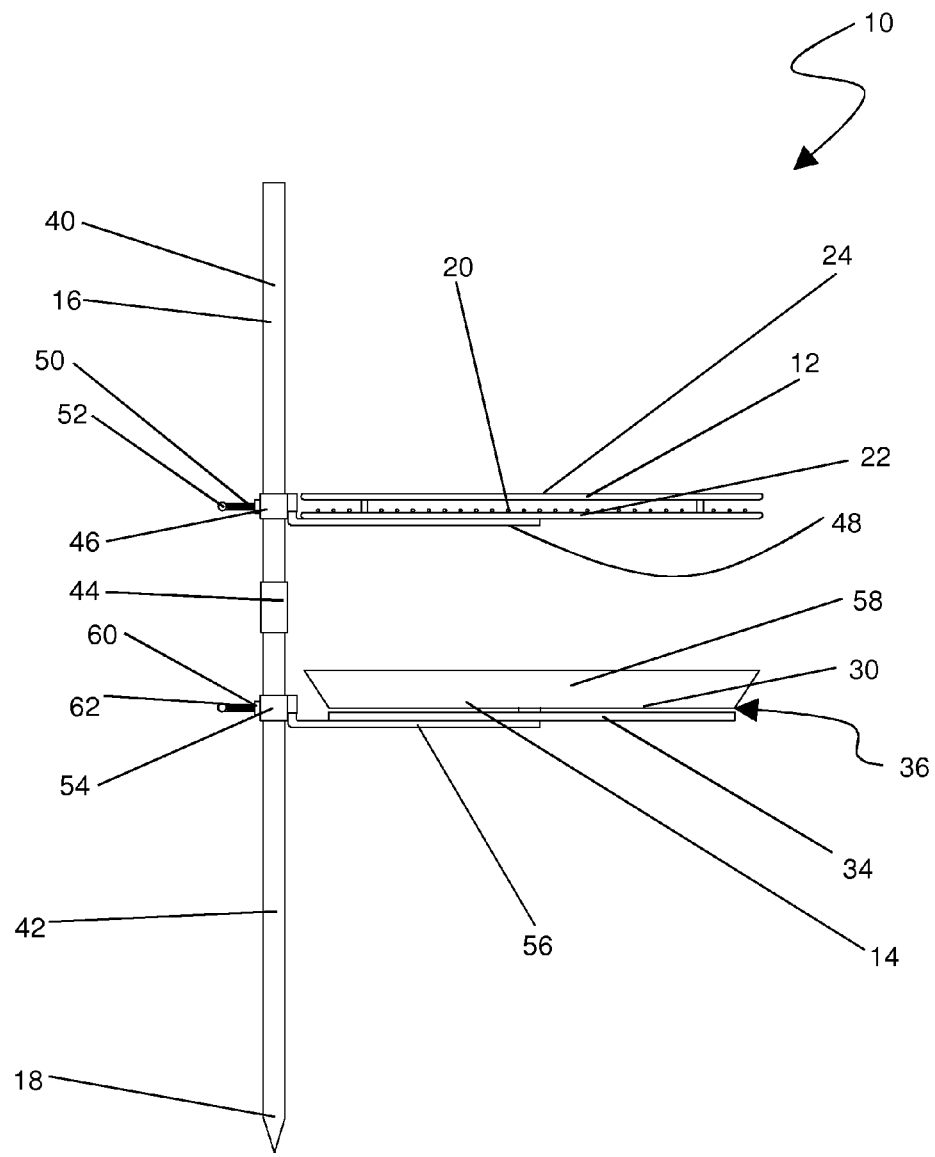
FIG. 4 is a side view of the portable grill assembly according to an embodiment of the present invention.

As illustrated by FIGS. 2-4, tray 14 further includes a plate 34 that may be positioned under and secured to bottom surface 30 by a single post 84. Post 84 is positioned at the center of tray 14 and plate 34. Plate 14 may be positioned relative to bottom surface 30 such that a gap 36 may be created to allow the flow of oxygen to enter gap 36 and exit through holes 32. Bottom surface 30 may also include a grid pattern 38. Grid 38 may be sized such that holes 32 are not blocked as fuel such as wood and the like is added to tray 14. Grid 38 act will act to elevate the fuel above surface 30 such that the air being drawn in through gap 36 can escape through holes 32 when fuel is loaded in tray 14. The constant flow of air though gap 36 and holes 32 will ensure that a constant and even fire may be created for optimal cooking and heating conditions.

Tray 14 includes a second sleeve 54 and anchor rods 56. Sleeve 54 may be assembled to tray 14 at wall 58 with anchor rods 56 extending from sleeve 54 and under plate 34 of tray 14 to provide support to tray 14 and further secure sleeve 54 to tray 14. In the same manner as described above for grill grate 12, sleeve 54 may be designed such that the inside diameter of sleeve 54 is slightly larger than the outside diameter of stake 16. With sleeve 54 sized in this manner, sleeve 54 may be slid onto stake 16 and may slide freely about the length of stake 16.

Sleeve 54 also includes a threaded hole 60 that is sized to accept a bolt 62. Hole 60 may be positioned in a side wall of sleeve 54 such that when bolt 62 is fed into hole 60, and stake 16 is positioned in sleeve 54, bolt 62 will engage a surface of stake 16. As bolt 62 continues to be fed through hole 60, the exterior surface of stake 16 will engage the interior surface of sleeve 54. When ample force is applied between bolt 62, sleeve 54 and stake 16, tray 14 will be secured to stake 16 and ready for cooking. In this particular embodiment of the present invention, bolt 62 is illustrated in the shape of an 'L' and may be designed in this manner to allow one to grasp bolt 62 with their hand and turn easily. Although bolt 62 is shown in the shape of an 'L', it is important to note, however, that bolt 62 may be any shape and still be used to secure tray 14 to stake 16.

Tray 14 may be manufactured of any materials such as metals, ceramics and the like, that are capable of withstanding the high temperatures generated from the fire produced by the chosen fuel. Tray 14 along with grate 12 are designed to be used on multiple occasions for the cooking and heating of food and liquids, so the materials should be capable of withstanding the high temperatures as well as the elements of air and water.

Figure 5:
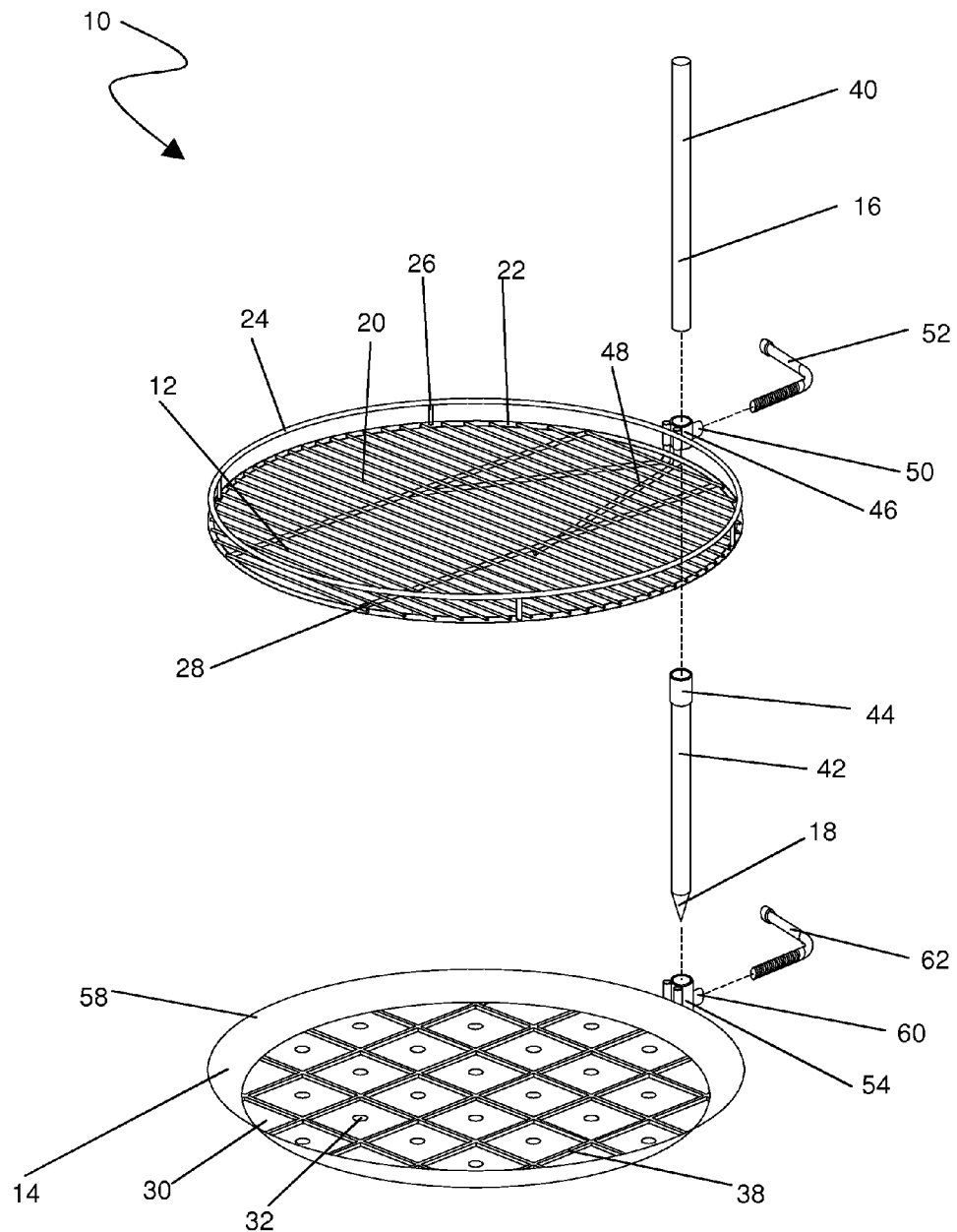
FIG. 5 is an exploded view of the portable grill assembly according to an embodiment of the present invention.

In this particular embodiment of the present invention, mounting stake 16 is illustrated as two separate pieces in FIGS. 5 and 5A. Mounting stake 16 includes a top segment 40 and a bottom segment 42. A coupler 44 is included as well as a means to assemble top segment 40 with bottom segment 42 to create mounting stake 16. Coupler 44 may be a simple sleeve that includes a lip 86 on the interior surface of coupler to serve as a stop. (see FIGS. 5B and 5C) Lip 86 will be designed such that the interior diameter of lip 86 is smaller than the exterior diameter of top segment 40 and bottom segment 42. Top segment 40 will stop at lip 86 as top segment 40 enters a first end of coupler 44 and bottom segment 42 will stop at lip 86 as bottom segment 42 enters an opposite end of coupler 44. Coupler 44 will position and secure top segment 40 and bottom segment 42 to create mounting stake 16.

Alternatively, coupler 44 may include a threaded interior wall. Top segment 40 and bottom segment 42 may include a threaded section for engaging the threaded walls of coupler 44. Top segment 40 and bottom segment 42 may be screwed into opposite ends of coupler 44 to provide for a more positive securement of stake 16. No matter the means of assembly, mounting stake 16 may be designed as two separate pieces for ease of storage and package while at the same time minimizing the number of pieces for assembly. However, it is important to note, the mounting stake 16 may be designed to be a single piece, or, alternatively, stake 16 may include a number of segments and couplers that require assembly, yet still maintain the same concepts of the invention as described above.

Portable grill assembly 10 may be assembled in the following manner upon arrival to a campsite, tailgate, picnic area and the like. Top segment 40 may be assembled to bottom segment 42 at coupler 44 to fully assemble stake 16. With stake 16 fully assembled, first sleeve 46 of grill grate 12 may engage stake 16 and grate 12 may be positioned about stake 16 by sliding sleeve 46 about stake 16 until the desired position is located. Once positioned, bolt 52 may be introduced to threaded hole 50 and bolt 52 may be rotated within hole 50 until bolt 52 engages stake 16 and provides enough force to secure sleeve 46 and grate 12 to stake 16.

Fire tray 14 may be assembled in much the same manner to stake 16. Second sleeve 54 of fire tray 14 may engage stake 16 and tray 14 may be positioned about stake 16 by sliding sleeve 54 about stake 16 until the desired position is located. Once positioned, bolt 62 may be introduced to threaded hole 60 and bolt 62 may be rotated within hole 60 until bolt 62 engages stake 16 and provides enough force to secure sleeve 54 and tray 14 to stake 16. Ideally, tray 14 will be positioned below grate 12 such that any fuel added to tray 14 may be lit to create a fire that will cook or heat the food or liquids above the fire and positioned on grate 12.

With portable grill assembly 10 fully assembled, grill 10 may be secured in the ground by driving pointed end 18 of stake 16 into the ground such that grill 10 will positioned upright and ready for cooking. In this position, grate 12 and tray 14 will be positioned relatively parallel or level to the ground such that any fuel added to tray 14 and any food or cooking vessels added to grate 14 will not roll or slide off tray 14 or grate 12.

Figure 6:
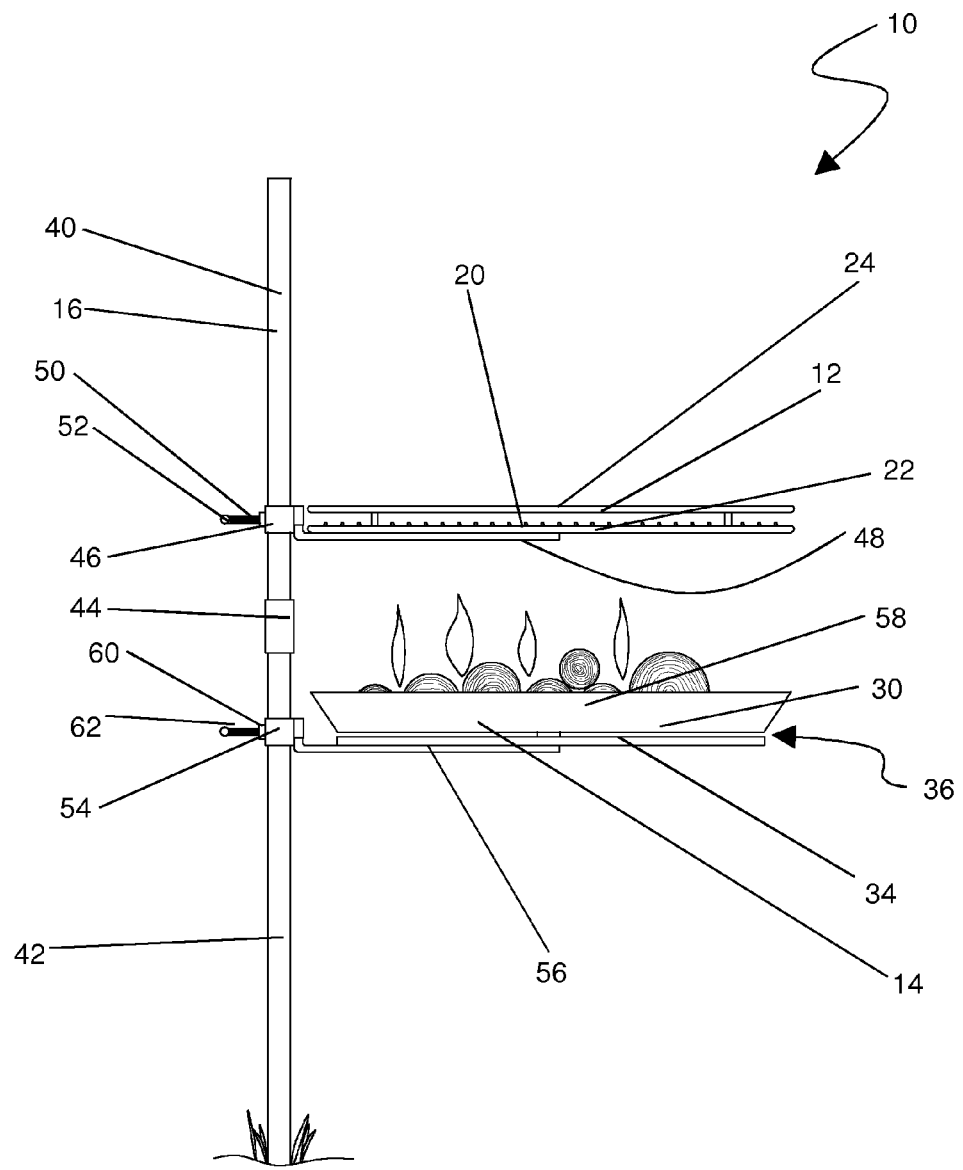
FIG. 6 is a side view of the portable grill assembly illustrated with a wood fire according to an embodiment of the present invention.
Figure 7:
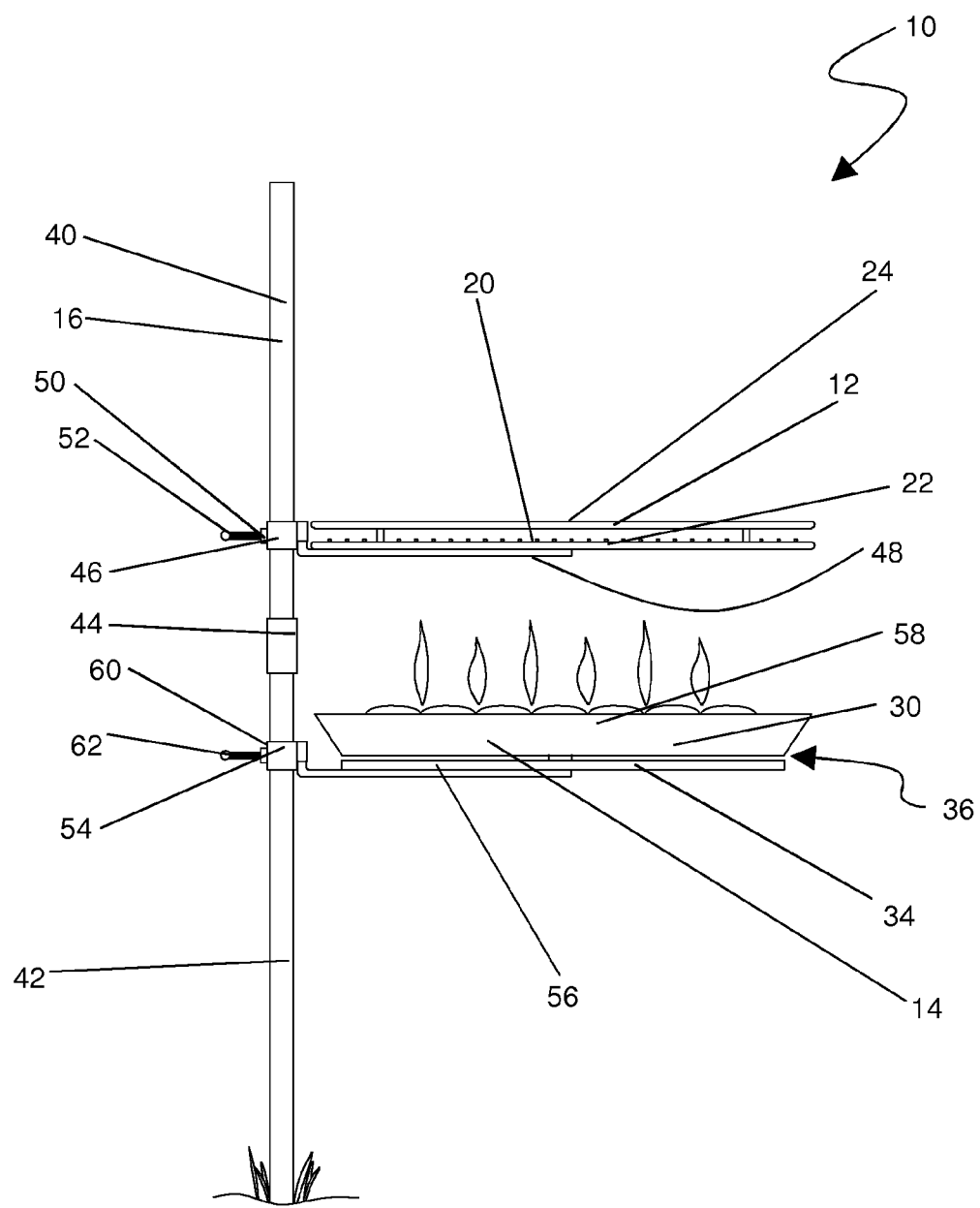
FIG. 7 is a side view of the portable grill assembly illustrated with a charcoal briquette fire according to an embodiment of the present invention.

Any type of fuel such as wood, charcoal and the like (see e.g. FIGS. 6 and 7) may be added to fire tray 14 and a fire may be started. Oxygen may flow through gap 36 and holes 32 to aid the combustion process so that the fire may provide an even temperature for cooking. Depending on the temperature level required, the positioning between grate 12 and tray 14 may be changed to raise or lower the temperature at the surface of grate 12. Bolts 52 and 62 may be rotated such that sleeves 46 and 54 may be allowed to slide freely about stake 16 once again. The ability to position and reposition grate 12 and tray 14 relative to one another will allow one to vary the cooking temperatures at grate 14. This is advantages because different types of food cook at different times and different temperatures, therefore providing for a means of ensuring that all food may be cooked to meet specifications for taste and preference and more importantly to ensure that all food is cooked to a safe temperature for consumption.

Figure 8:
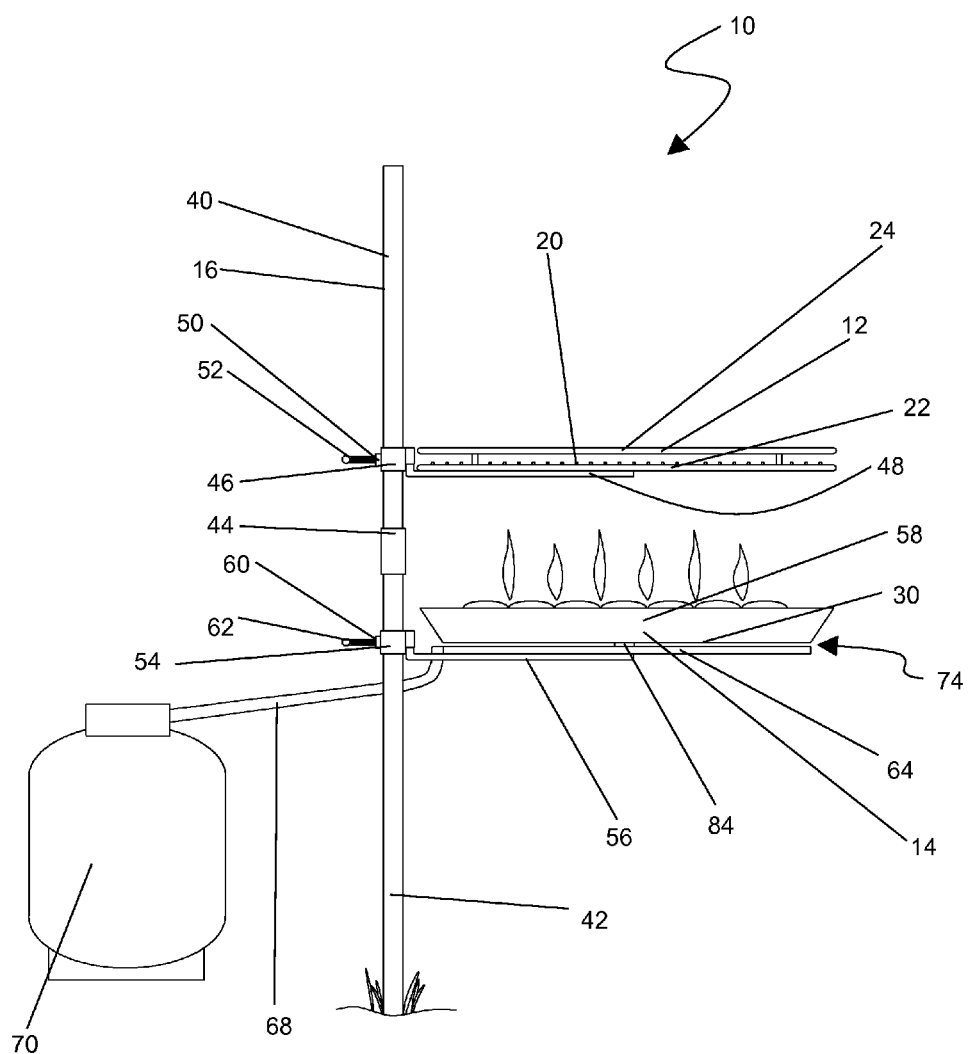
FIG. 8 is a side view of the portable grill assembly illustrated with a fuel tank for a gas fire according to an embodiment of the present invention.
Figure 9A:
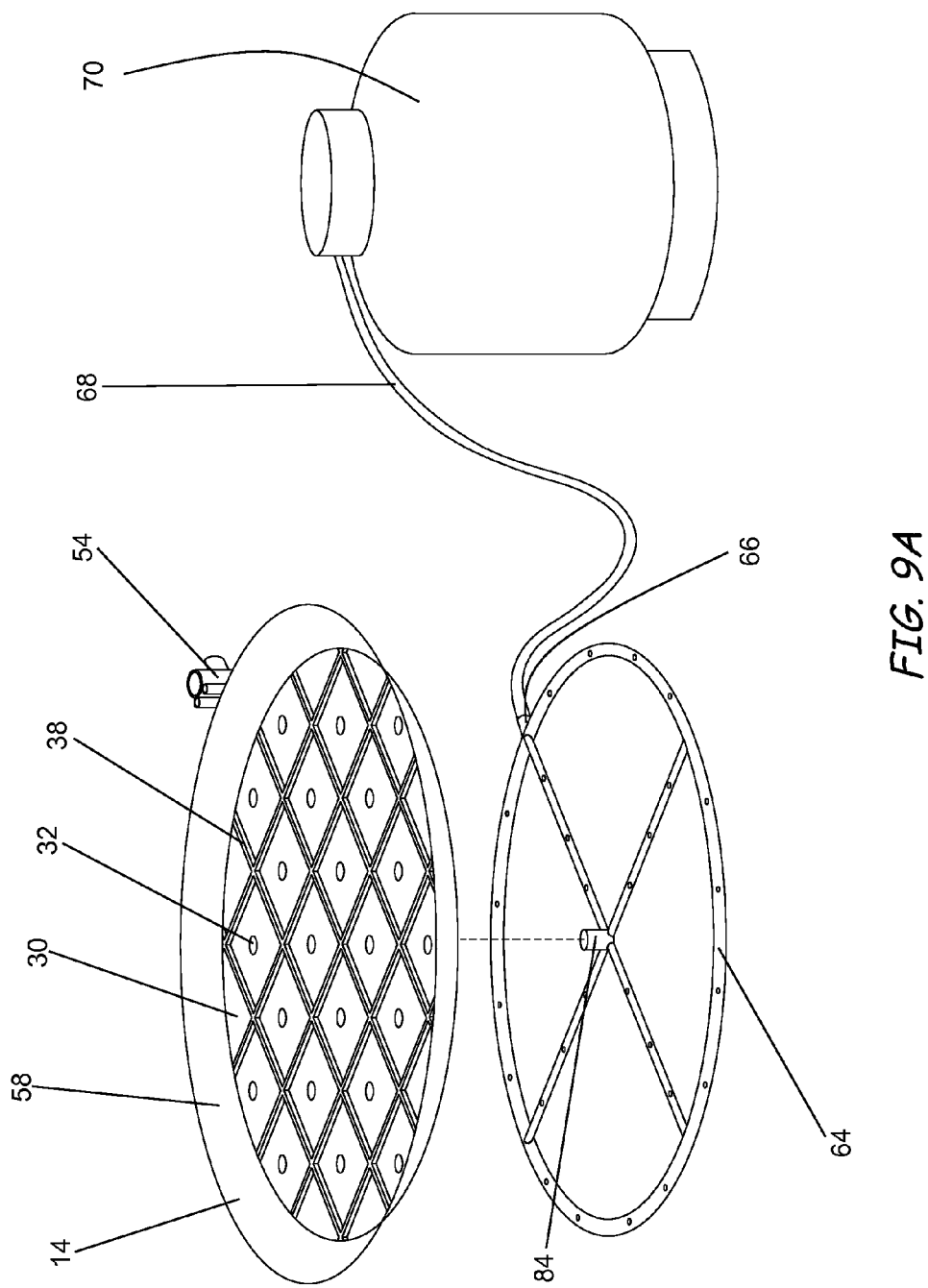
FIG. 9A is an exploded view of a fire tray assembly according to an embodiment of the present invention.
Figure 9B:
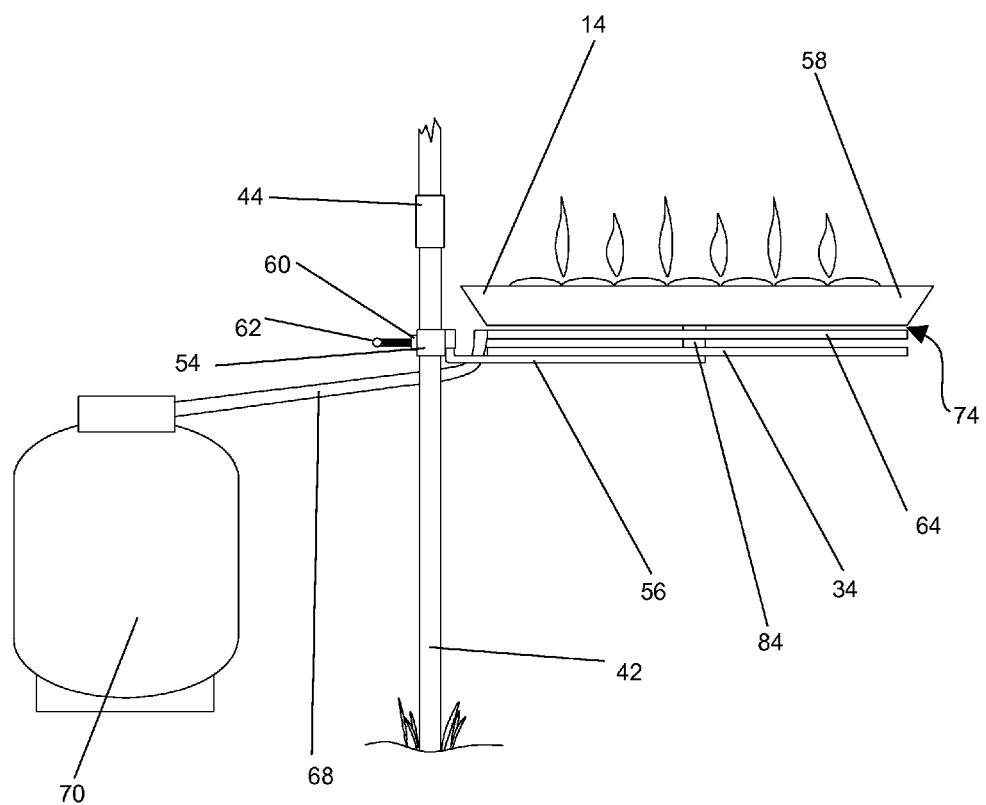
FIG. 9B is a side view of the portable grill assembly illustrated with a fuel tank for a gas fire according to another embodiment of the present invention.

FIGS. 8, 9A and 9B depict another embodiment of the present invention. In this particular embodiment, flame tube 64 may be added to grill assembly 10 and may replace plate 34. Tube 64 that may be positioned under and secured to bottom surface 30 by a single post 84. Post 84 is positioned at the center of tray 14 and tube 64. Tube 64 may be constructed in a circle and may include one or more tubes that extend the diameter of the circle crossing through the center of the circle. FIG. 9A illustrates two such lengths of tube extending the diameter of the circle. However, it is important to note that a number of tubes may be used to construct flame tube 64 and they may vary in length.

Flame tube 64 may also include a connector 66 that may be adapted to accept pipe 68 that extends from a source of fuel such as natural gas, propane and the like. In this particular embodiment, a typical propane tank 70 is shown with the present invention. Flame tube 64 further includes a plurality of holes 72 that will allow for the passage of the fuel from the source or tank 70 through pipe 68 and tube 64. Once the fuel is allowed to flow, the fuel may be ignited at holes 72 to create a fire. A sufficient gap 74 (similar to gap 36) is created when tube 64 is added to tray 14 such that the flames from tube 64 will extend through holes 32 of bottom surface 30. The flame will, in turn, increase the temperature of grate 12 to a sufficient level for cooking of food and the heating of liquids.

One may choose to cook only with the flame provide by the gas or liquid fuel, or alternatively, solid fuel such as wood, charcoal and the like may be added to tray 14 as well and the flame produced by the gas or liquid fuel may be used to ignite the solid fuel. In this particular embodiment illustrated by FIG. 9B, plate 34 may be added to tray 14 below flame tube 64 to capture any ash or burning embers that may fall through holes 32 of bottom surface 30.

Figure 10:
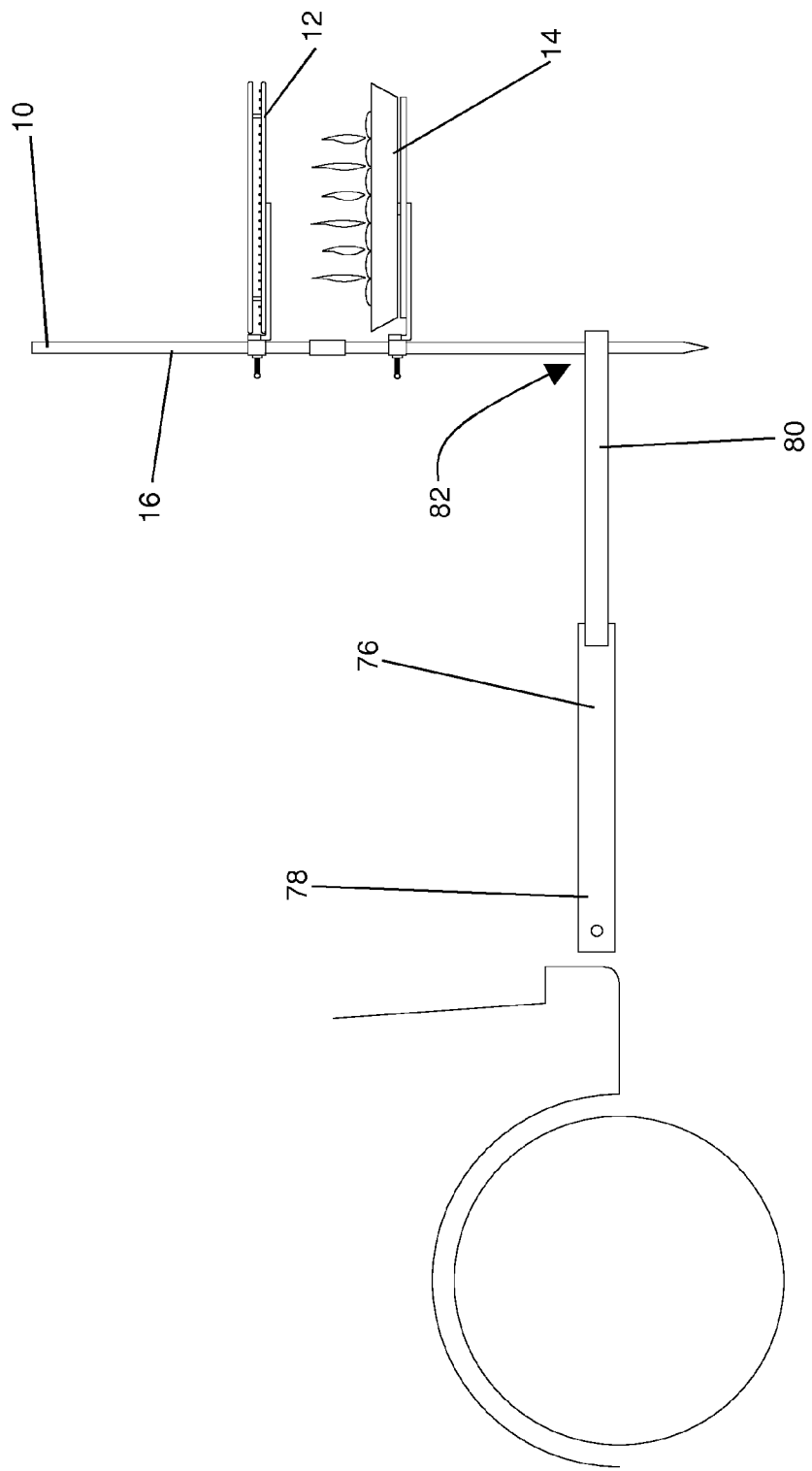
FIG. 10 is side view of the portable grill assembly shown mounted to a vehicle mounted hitch according to another embodiment of the present invention.

In yet another embodiment of the present invention grill assembly 10 may be adapted to be supported by alternative means rather than driving mounting stake 16 into the ground. In this particular embodiment, as illustrated in FIG. 10, grill assembly may be mounted to an arm 76 that may be adapted to connect to a typical towing hitch found on many motor vehicles. Arm 76 may include a first end 78 that may be inserted into a typical towing hitch. Holes may be included in arm 76 that align with holes in the hitch such that a pin may be inserted through the towing hitch and arm 76 to secure arm 76 to the hitch.

Arm 76 may also include a second end 80 having a hole 82 for accepting mounting stake 16. In much the same manner sleeve 46 of grate 12 and sleeve 54 of tray 14 are adapted to slide freely over stake 16, hole 82 is adapted to allow stake 16 to slide freely in and out of hole 82. A bolt may also be used to secure stake 16 in hole 82 and to arm 76 in much the same manner described above that bolts 52 and 62 secure grate 12 and tray 14, respectively, to stake 16. With grill assembly 10 secured to arm 76 in this manner, grill assembly 10 may be used for cooking in areas where the ground may not be suitable for accepting end 18 of stake 16. For example, if the ground were solid rock, concrete, asphalt and the like, pointed end 18 would have a difficult time penetrating those surfaces and stake 16 would not be able to support grill assembly 10 for cooking purposes. The alternative support means of arm 76 and similar supports will cure the issues of providing adequate support of grill assembly 10 for cooking.

Figure 11:
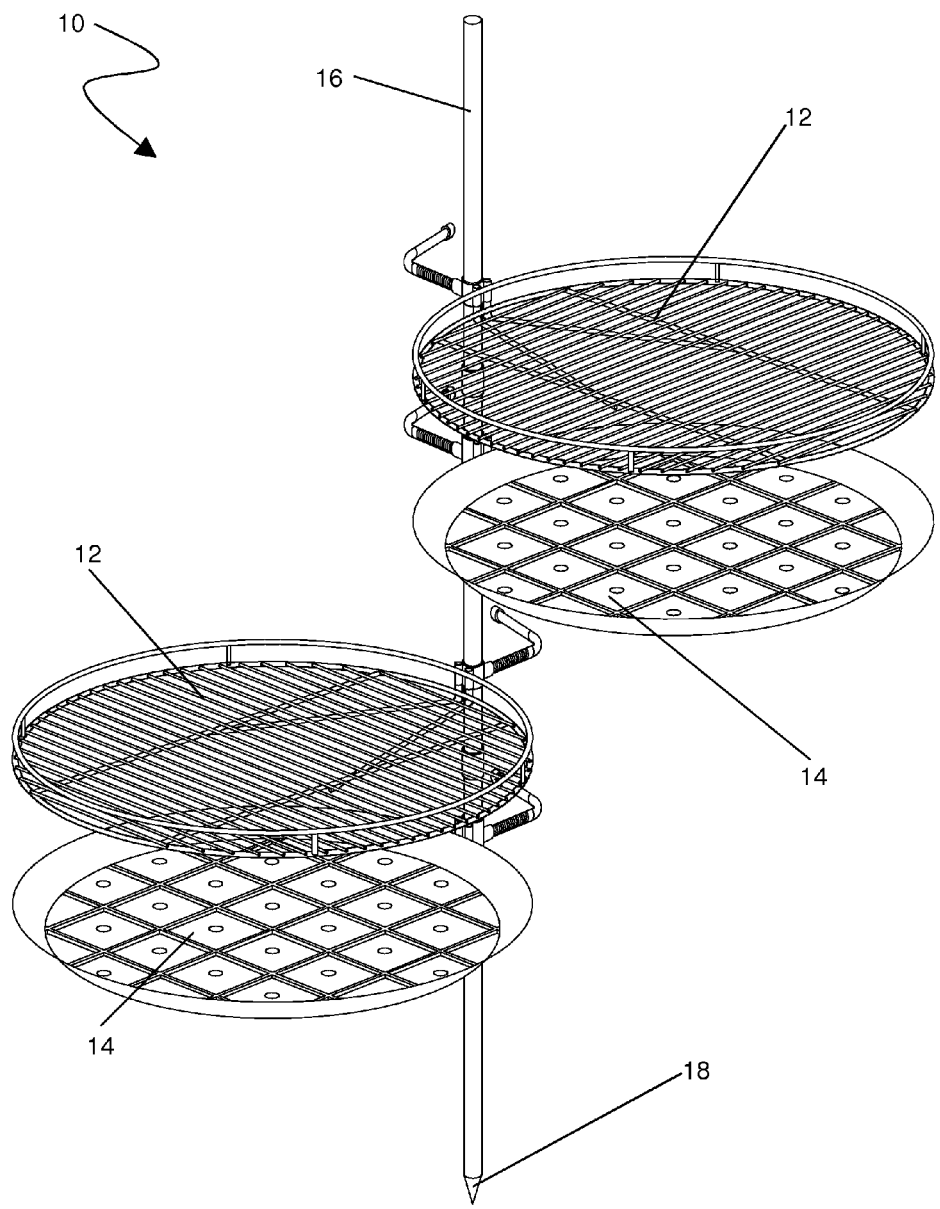
FIG. 11 is a perspective view of a portable grill assembly according to yet another embodiment of the present invention.

In still another embodiment of the present invention illustrated by FIG. 11, portable grill assembly 10 may be modified to support multiple grate 12 and tray 14 sets. A plurality of grate 12 and tray 14 sets may be added to stake 16 to provide for a number of cooking surfaces off the same stake 16. Multiple cooking surfaces may be desirable because all food does not cook at the same temperature and within the same period of time. As stated previously, stake 16 may be designed to any length and may include multiple segments that may be connected by multiple couplers 44 to create any length of stake 16 desired. Increasing the length of stake 16 will allow for multiple grills 12 and trays 14 to be added to stake 16 such that multiple cooking stations can be used at the same time. As stated above, the distance between tray 14 and grate 12 can be varied depending on the temperature level needed to cook the different types of food cooked and liquid to be heated.

Although grill assembly 10 is shown having grate 12 and tray 14 in the shape of a circle, it is important to note, however, the grate 12 and tray 14 may be manufactured in any shape, circle, square, rectangle, triangle, trapezoid and the like. No matter the shape of grate 12 and tray 14, the inventive concept behind grill assembly 10 will remain the same, namely to provide a grill assembly that may be compact for ease of stowage during travel and will not take up so much space that it could be stored while travel by bicycle, motorcycle and the like while at the same time providing a means of elevating a fire off the ground for cooking especially in areas where ground fires may be banned or even illegal in an effort to prevent forest and wild fires. Yet another advantage of grill assembly 10 will be the ease of connection to a liquid of gaseous fuel source such as propane or natural gas when no other fuel source is available for cooking.

The present invention has been particularly shown and described with reference to the foregoing embodiment, which is merely illustrative of the best modes presently known for carrying out the invention. It should be understood by those skilled in the art that various alternatives to the embodiment of the invention described herein may be employed in practicing the invention without departing from the spirit and scope of the invention as defined in the following claims. It is intended that the following claims define the scope of the invention and that the method within the scope of these claims and their equivalents be covered thereby. This description of the invention should be understood to include all novel and non-obvious combination of elements described herein, and claims may be presented in this or a later application to any novel non-obvious combination of these elements. Moreover, the foregoing embodiment is illustrative, and no single feature or element is essential to all possible combinations that may be claimed in this or a later application.

What is claimed is:

1. A portable grill assembly comprising:
   a grill grate;
   a fire tray, said fire tray including:
   a plurality of holes, said holes configured to allow the flow of oxygen into said fire tray;
   a plate, said plate configured to be secured to a bottom surface of said fire tray by a single post, said post being positioned at the center of said plate and said bottom surface;
   a gap, said gap being created between said plate and said bottom surface of said fire tray by a length of said post to enable a uniform flow of oxygen to pass through said gap on all sides of said fire tray into said holes; and
   a grid pattern, said grid pattern being integrated within said bottom surface of said fire tray and configured to extend upward from said bottom surface of said fire tray such that a fuel is elevated over said holes to enable a uniform flow of oxygen through said gap, said holes and to the fuel;
   a support stake, said support stake including at least one coupler configured to secure multiple sections of said support stake, said coupler including a lip, said lip configured within the interior diameter of said coupler to prevent movement of sections of said support stake relative to said coupler; and
   wherein said support stake is configured to secure and position said fire tray a distance above the ground and said support stake is configured to secure and position said grill grate a distance above said fire tray;
   a flame tube, said flame tube including:
   a plurality of holes;
   a connector, said connector configured to be connected to a fuel source by a pipe;
   and wherein said flame tube is generally circular in shape and said flame tube is configured to be connected between said bottom surface of said fire tray and said plate by said post such that an air gap is created between said flame tube and said bottom surface of said fire tray by the length of said post to enable a uniform flow of oxygen, fuel and flames to pass into said holes.

2. The portable grill assembly as recited in claim 1, wherein said grill grate is circular in shape and said fire tray is circular in shape.

3. The portable grill assembly as recited in claim 1, wherein said grill grate is rectangular in shape and said fire tray is rectangular in shape.

4. The portable grill assembly as recited in claim 1, wherein said grill grate further includes an outer ring;
   an upper ring;
   at least one support post, said support post configured to position said upper ring above said outer ring;
   at least one support dowel;
   at least one anchor rod; and
   a plurality of rods extending generally parallel to one another across said at least one support dowel and intersecting said outer ring.

5. The portable grill assembly as recited in claim 1, wherein said grill grate includes a first sleeve, said first sleeve having an inner diameter that is slightly larger than an outside diameter of said support stake such that said first sleeve may slide freely about said support stake.

6. The portable grill assembly as recited in claim 1, wherein said fire tray includes a second sleeve, said second sleeve having an inner diameter that is slightly larger than an outside diameter of said support stake such that said second sleeve may slide freely about said support stake.

7. The portable grill assembly as recited in claim 5, wherein said first sleeve includes a threaded hole, said threaded hole sized to accept a fastener for securing said first sleeve of said grill grate to said support stake.

8. The portable grill assembly as recited in claim 6, wherein said second sleeve includes a threaded hole, said threaded hole sized to accept a fastener for securing said second sleeve of said fire tray to said support stake.

9. The portable grill assembly as recited in claim 1, further including an arm, said arm having a first end configured to secure and support said support stake.

10. The portable grill assembly as recited in claim 1, wherein said support stake is configured to secure and support at least two of said grill grates and at least two of said fire trays.

11. A portable grill assembly for elevating a fire a distance above the ground, said portable grill assembly comprising:
   a grill grate, said grill grate including:
   an outer ring;
   an upper ring;
   at least one support post, said support post configured to position said upper ring above said outer ring;
   at least one support dowel;
   at least one anchor rod; and
   a plurality of rods extending generally parallel to one another across said at least one support dowel and intersecting said outer ring;
   a fire tray, said fire tray including:
   a plurality of holes, said holes configured to allow the flow of oxygen into said fire tray;
   a plate, said plate configured to be secured to a bottom surface of said fire tray by a single post, said post being positioned at the center of said plate and said bottom surface;
   a gap, said gap being created between said plate and said bottom surface of said fire tray by a length of said post to enable a uniform flow of oxygen to pass through said gap on all sides of said fire tray into said holes; and
   a grid pattern, said grid pattern being integrated within said bottom surface of said fire tray and configured to extend upward from said bottom surface of said fire tray such that a fuel is elevated over said holes to enable a uniform flow of oxygen through said gap, said holes and to the fuel;
   a support stake, said support stake including at least one coupler configured to secure multiple sections of said support stake, said coupler including a lip, said lip configured within the interior diameter of said coupler to prevent movement of sections of said support stake relative to said coupler; and
   wherein said support stake is configured to secure and position said fire tray a distance above the ground and said support stake is configured to secure and position said grill grate a distance above said fire tray;
   a flame tube, said flame tube including:
   a plurality of holes;
   a connector, said connector configured to be connected to a fuel source by a pipe;
   and wherein said flame tube is generally circular in shape and said flame tube is configured to be connected between said bottom surface of said fire tray and said plate by said post such that an air gap is created between said flame tube and said bottom surface of said fire tray by the length of said post to enable a uniform flow of oxygen, fuel and flames to pass into said holes.

12. The portable grill assembly as recited in claim 11, wherein said grill grate is circular in shape and said fire tray is circular in shape.

13. The portable grill assembly as recited in claim 11, wherein said grill grate is rectangular in shape and said fire tray is rectangular in shape.

14. The portable grill assembly as recited in claim 11, wherein said grill grate includes a first sleeve, said first sleeve having an inner diameter that is slightly larger than an outside diameter of said support stake such that said first sleeve may slide freely about said support stake.

15. The portable grill assembly as recited in claim 11, wherein said fire tray includes a second sleeve, said second sleeve having an inner diameter that is slightly larger than an outside diameter of said support stake such that said second sleeve may slide freely about said support stake.

16. The portable grill assembly as recited in claim 14, wherein said first sleeve includes a threaded hole, said threaded hole sized to accept a fastener for securing said first sleeve of said grill grate to said support stake.

17. The portable grill assembly as recited in claim 15, wherein said second sleeve includes a threaded hole, said threaded hole sized to accept a fastener for securing said second sleeve of said fire tray to said support stake.

* * * * *